US006968205B2

(12) United States Patent
Burnham

(10) Patent No.: US 6,968,205 B2
(45) Date of Patent: Nov. 22, 2005

(54) METHODS AND SYSTEMS FOR LANDLINE ACCESS TO WIRELESS NETWORKS

(75) Inventor: William S. Burnham, Stockbridge, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 488 days.

(21) Appl. No.: 10/095,515

(22) Filed: Mar. 13, 2002

(65) Prior Publication Data

US 2003/0176199 A1 Sep. 18, 2003

(51) Int. Cl.[7] .............................................. H04M 1/00
(52) U.S. Cl. .............................. 455/554.1; 455/554.2; 455/555; 455/464; 370/352; 379/220.01; 379/221.09
(58) Field of Search ......................... 455/554.1, 554.2, 455/552.1, 553.1, 555, 557, 464; 379/220.01, 379/221.09; 370/351–356

(56) References Cited

U.S. PATENT DOCUMENTS

| | | | |
|---|---|---|---|
| 5,204,894 A | | 4/1993 | Darden |
| 5,612,990 A | * | 3/1997 | Meier et al. ................. 455/466 |
| 5,694,463 A | * | 12/1997 | Christie et al. ........ 379/221.09 |
| 5,812,953 A | | 9/1998 | Griffith et al. |
| 5,905,785 A | * | 5/1999 | Dunn et al. ............. 379/112.08 |
| 5,911,123 A | * | 6/1999 | Shaffer et al. ............ 455/554.1 |
| 5,983,098 A | | 11/1999 | Gerszberg et al. |
| 6,014,377 A | * | 1/2000 | Gillespie ..................... 370/351 |
| 6,073,029 A | * | 6/2000 | Smith et al. ................. 455/555 |
| 6,282,267 B1 | | 8/2001 | Nolting |
| 6,295,292 B1 | | 9/2001 | Voit et al. |
| 6,633,636 B1 | * | 10/2003 | McConnell et al. ... 379/220.01 |
| 6,643,523 B2 | * | 11/2003 | Goetz ......................... 455/557 |

FOREIGN PATENT DOCUMENTS

WO PCT/US03/07453 9/2003

\* cited by examiner

Primary Examiner—Stephen M. D'Agosta
(74) Attorney, Agent, or Firm—Merchant & Gould

(57) ABSTRACT

Systems and methods provide landline access to a wireless network. A system includes a landline communications network, and a multiline hunt group coupled to the landline communications network. The multilane hunt group includes one or more dedicated ports, which are coupled to the wireless network. The landline communications network may be coupled to a landline communications device and configured to receive a wireless network landline access number from the landline communications device. The landline communications network may also send a calling number associated with the landline communications device to a service control point as part of a query and receive a multiline hunt group access number from the service control point.

41 Claims, 6 Drawing Sheets

METHODS AND SYSTEMS FOR LANDLINE ACCESS TO WIRELESS NETWORKS

BACKGROUND OF THE INVENTION

1. Field of the Invention

Embodiments of the present invention relate to landline and wireless networks. More particularly, embodiments of the present invention relate to systems and methods for landline access to wireless networks.

2. Background Information

The proliferation of wireless networks, such as cellular telephone networks, has impacted the business of landline telecommunications service providers. For example, landline telecommunications service providers, such as the regional Bell operating companies ("RBOCs"), have operated networks of pay telephones. Demand for pay telephone services has declined, however, based at least in part on the proliferation of wireless network services. This decline in demand for pay telephone services has resulted in a decline in revenue for many landline telecommunications service providers.

Expansion of wireless networks can be expensive. For example, when a wireless service provider expands its service area to cover a new geographic area, the wireless service provider typically has to build (or lease rights to) a wireless services transmission tower to transmit wireless services to users and provide connectivity between the new wireless services transmission tower and the wireless network of the wireless service provider. Construction and operation of (or the leasing of rights to) a wireless services transmission tower can require substantial expense and market risk.

Users of wireless services may experience service problems based at least in part on the limited geographic reach of a wireless network. For example, known wireless networks can have "shaded" areas were users cannot establish reliable communications with the wireless network, due to a lack of a signal from a wireless base station, due to low signal strength, and so on. A user can, as an example, have a residence that is situated in a geographic depression or in an area behind a ridge or hill from the wireless base station. While the user cannot engage in reliable wireless communications from inside the shaded area, users in the general surrounding area outside the shaded area can engage in reliable wireless communications.

An example of a more widespread shaded area occurs when a wireless service provider establishes wireless network coverage of a metropolitan area and major commuting routes to the metropolitan area. Users that commute from exurbs or rural areas to work in the metropolitan area can engage in reliable wireless communications while at work in the metropolitan area or on or in the immediate vicinity of the major commuting routes, but may not be able to engage in reliable wireless communications while at home in the exurbs or rural areas.

Users can be disadvantaged by an inability to engage in reliable wireless communications. A wireless service user (e.g., subscriber) typically has a service contract with a wireless service provider. The service contract can include a monthly fee, service features, and billing features. Examples of service features can include an amount of peak (i.e., business hours) airtime provided by the monthly fee (e.g., 300 peak minutes per month), free nights and weekends airtime, no additional fee for long-distance calls, no additional fees for long-distance for calls made from a home area, no roaming fees, etc. When the user is unable to engage in reliable wireless communications, he may be unable to take advantage of wireless service features provided by his service contract. In view of the foregoing, it can be appreciated that a substantial need exists for systems and methods that can advantageously provide for landline access to wireless networks.

BRIEF SUMMARY OF THE INVENTION

Embodiments of the present invention relate to systems and methods for providing landline access to a wireless network. In an embodiment, a system comprises a landline communications network and a multiline hunt group coupled to the landline communications network. The multiline hunt group includes one or more dedicated ports which are coupled to the wireless network.

In another embodiment of the present invention, a system for providing landline access to a wireless network includes a multiline hunt group that has a plurality of incoming call ports and a plurality of wireless network ports. An incoming call port of the plurality of incoming call ports receives a call, and a wireless network port of the plurality of wireless network ports sends the call to the wireless network. The system also includes a landline communications network coupled to the multiline hunt group. The landline communications network includes a central office switch.

According to a further embodiment of the present invention, a method for providing landline access to a wireless network includes receiving a call from a landline communications device. The call is sent to a multiline hunt group of a landline communications network. The multiline hunt group is associated with the wireless network, and the call is sent to the wireless network.

In another embodiment, a method for providing landline access to a wireless telecommunications network includes operating a landline telecommunications network that includes a landline telecommunications device. A call to a wireless telecommunications network access telephone number is received from the landline telecommunications device. The call is sent to a multiline hunt group of the landline telecommunications network. The multiline hunt group is associated with the wireless telecommunications network, and the call is sent to the wireless telecommunications network.

According to another embodiment of the present invention, a system for providing landline access to a wireless network includes means for receiving a call from a landline communications device and means for sending the call to a multiline hunt group of a landline communications network. The multiline hunt group is associated with the wireless network. The system also includes means for sending the call to the wireless network.

In still yet another embodiment, a method for providing landline access to a wireless network includes a step for receiving a call from a landline communications device and a step for sending the call to a multiline hunt group of a landline communications network. The multiline hunt group is associated with the wireless network. The method also includes a step for sending the call to the wireless network.

In a further embodiment of the present invention, a computer-readable medium stores a plurality of instructions to be executed by a processor for providing landline access to a wireless network. The plurality of instructions include instructions to receive a call from a landline communications device and instructions to send the call to a multiline hunt group of a landline communications network. The multiline hunt group is associated with the wireless network.

The plurality of instructions also include instructions to send the call to the wireless network.

Figure 1:
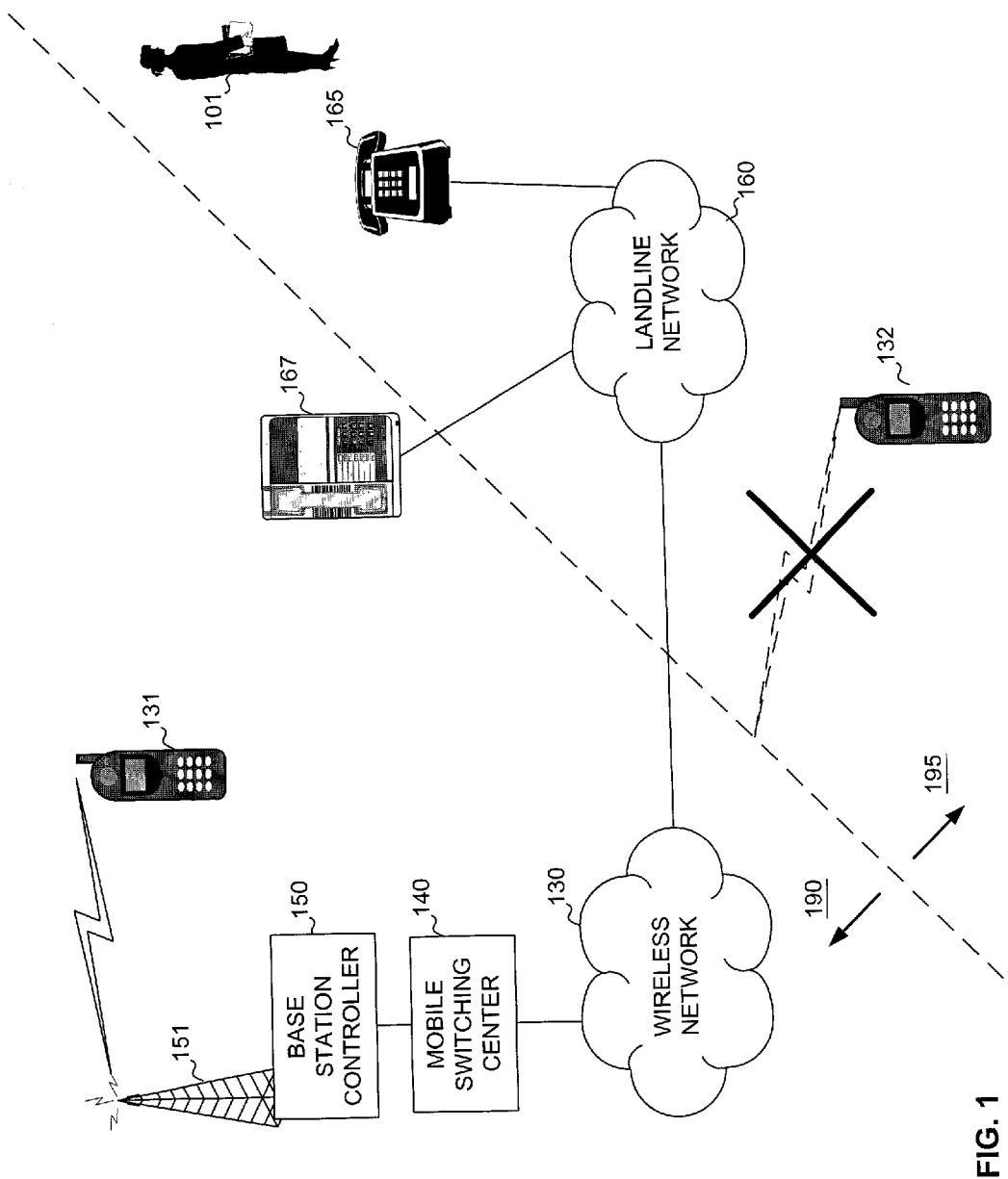
FIG. 1 is a schematic diagram of an embodiment of the present invention.

Before embodiments of the present invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

According to an embodiment of the present invention, a system can advantageously provide for landline access to wireless networks. A wireless service subscriber may not be able to engage in reliable wireless communications with a wireless network. For example, the wireless service subscriber may have lost or forgotten his wireless communications device (e.g., wireless telephone), the battery of the user's wireless communication device may be drained, the user may be in a shaded area, the user may be outside the area of operation of the wireless service provider, and so on. The user nonetheless wishes to engage in communications via the wireless network (e.g., to take advantage of a billing relationship, to take advantage of a service feature such as free long-distance calls, etc.). The user can access the wireless network via a landline communications network. For example, the user can dial a wireless network landline access number and be connected with the wireless network. The user can send user authentication information to the wireless network (e.g., a user number and a personal identification number). After the wireless network has authenticated the user, the user can engage in communications via the wireless network (e.g., make telephone calls via the wireless network).

In an embodiment, a landline service provider can be a local exchange carrier ("LEC") such as an RBOC, an independent local operating company, an incumbent LEC, a competitive local exchange carrier ("CLEC"), and so on. The landline service provider can contract with a wireless service provider to establish an access number for the subscribers of the wireless service provider to connect to the wireless network via the landline service provider's network. The access number can be to a multi-line hunt group ("MLH") that provides network ports for access to the wireless network. A landline service provider can provision an access number for each local access and transport area ("LATA"). The landline service provider can realize an access fee from the wireless service provider each time the access number is called, based on the amount of usage of the access number, and so on. Wireless service subscribers can dial the access number and be connected with the wireless service provider.

The access number can be a toll-free number, a toll number, a local number, and so on. In an embodiment, a wireless service provider can select a toll-free number (e.g., 1-800-xxx-yyy) that a wireless service subscriber can call from a landline communications device (e.g., a payphone, a residential phone, etc.) coupled to a landline network of a landline service provider. When the user places the call, the call is routed to a local access number based at least in part on the calling number of the landline communications device. The call is then connected to the wireless network of the wireless service provider so that the user can engage in communications via the wireless network.

In another embodiment of the present invention, a wireless service provider can select a local access number so that it can sign up subscribers in an area presently outside the service area of the wireless service provider. For example, the wireless service provider can decide that it desires at some point in the future to establish a wireless base station in an area (i.e., a targeted area) outside its service area (e.g., a small town, a suburban area, a rural area, etc.). The wireless service provider can contract for an access number with a landline service provider in the targeted area and sign up subscribers. While in the targeted area, the subscribers can access the wireless network via the access number and a landline communications device. While in the service area of the wireless service provider, the subscribers can access the wireless network via a wireless communications device. After the wireless service provider has a threshold number of subscribers in the targeted area, the wireless service provider can then undertake the expense of constructing and operating a wireless base station in the targeted area to provide its subscribers with wireless access to the wireless network. Accordingly, the wireless service provider need not undertake the risk and expense of constructing and operating a wireless base station prior to having subscribers in the targeted area.

FIG. 1 is a schematic diagram of an embodiment of the present invention. A wireless network 130 is typically coupled to a mobile switching center 140. Mobile switching center 140 typically includes a switch that provides services and coordination between wireless users of the wireless network and external networks (e.g., another wireless network, a landline network, the public switch telephone network ("PSTN"), etc.). Mobile switching center 140, for example, also can include a digital access and cross-connect system ("DACS"). A DACS is a digital switching device that routes and switches T-1 lines and DS-0 portions of lines among multiple T-1 ports. A DACS typically performs all the functions of a normal switch except that the connections are usually set up in advance of the call. DS-0 (i.e., Digital Signal, level 0) is a 64,000 bits per seconds ("bps") standard speed for digitizing a voice conversation using pulse code modulation ("PCM"), sampling the voice 8,000 times a second, and encoding the result in an 8-bit code. The T-1 standard of 1.544 Mbps can support 24 voice conversations, each of which is encoded at 64 kbps.

Mobile switching center 140 is typically coupled to base station controller 150 and base station transceiver 151. As used to describe embodiments of the present invention, the term "coupled" encompasses a direct connection, an indirect connection, or a combination thereof. Two devices that are coupled can engage in direct communications, in indirect communications, or a combination thereof. Moreover, two devices that are coupled need not be in continuous communication, but can be in communication typically, periodically, intermittently, sporadically, occasionally, and so on. Base station controller 150 is a component of a base station that supervises the functioning and control of one or more base station transceivers 151 and acts as a small switch. Base station transceiver 151 can include a tower, one or more antennae, and radio transmission and reception equipment to provide coverage of a geographic area for communication with wireless communications devices 131. Examples of wireless communications devices include a cellular telephone, a mobile telephone, a wireless modem, a wireless phone, a wireless personal digital assistant ("PDA"), a mobile computer, an interactive pager, a BlackBerry manufactured by Research in Motion Limited of Waterloo, Ontario, Canada, and so on.

Wireless network 130 is typically coupled to landline network 160, and landline network 160 is typically coupled to landline telephones 167 and 165. A user 101 can engage in communications via landline network 160 using landline telephone 167, landline telephone 165, and so on.

Wireless network 130 has a coverage area typically including an operational area 190 in which one or more wireless communications devices 131 can communicate with wireless network 130 via a base station (e.g., a base station including base station transceiver 151 and base station controller 150). Wireless network 130 can also have a coverage area that includes or is adjacent to non-operational area 195 in which wireless communication devices 132 cannot communicate with wireless network 130 via a base station. For example, a particular wireless communication device 131 can communicate via wireless network 130 when it is within operational area 190 but lose the ability to communicate via wireless network 130 when it moves into non-operational area 195. Non-operational area 195 can be outside the coverage area of wireless network 130. Non-operational area 195 can also be within the coverage area of wireless network 130 but be an area in which there is low or no signal strength from a wireless base station transceiver 151.

User 101 can be a subscriber of communications services provided by an operator of wireless network 130. For example, user 101 can have a wireless communications device that can communicate via wireless network 130 when it is within operational area 190 but loses the ability to communicate via wireless network 130 when it moves into non-operational area 195. According to an embodiment of the present invention, user 101 can access communications services provided at least in part by wireless network 130 via landline network 160 and telephone 165 when her wireless communications device is in non-operational area 195. User 101 can also access communications services provided at least in part by wireless network 130 via landline network 160 and telephone 167 when she is in operational area 190 but unable or unwilling to use her wireless communications device. For example, the wireless communications device may have a dead battery, can have a low battery, can be lost, may be somewhere else (e.g., left at home, left in a cab, left in the office, etc.), may be receiving a weak signal, may be unable to connect to a base station, and so on.

For example, user 101 can dial an access number into telephone 165 (or telephone 167) and be connected to wireless network 130 via landline network 160. User 101 can then authenticate herself to wireless network 130. For example, in an embodiment, user 101 authenticates herself by entering a subscriber identifier and a password (e.g., by dialing Dual-Tone MultiFrequency ("DTMF") digits, by speaking the digits, by speaking a subscriber identifier and password, by speaking a phrase for voice recognition, etc.). The subscriber identifier can be a wireless telephone number, an electronic serial number, a customer identifier, an account number, a Social Security number, and so on. The password can be a personal identification number, a code work, a code phrase, and so on. In an embodiment, the subscriber identifier and password are entered as a single string of digits (e.g., 703-770-7900-7631). After user 101 has successfully authenticated herself to the wireless network 130, she can enter a telephone number (e.g., by dialing DTMF digits, by speaking the digits, by speaking a phrase associated with a number, etc.), and wireless network 130 can place the call. In another embodiment of the present invention, user 101 first enters the telephone number and then enters authentication information.

Figure 2:
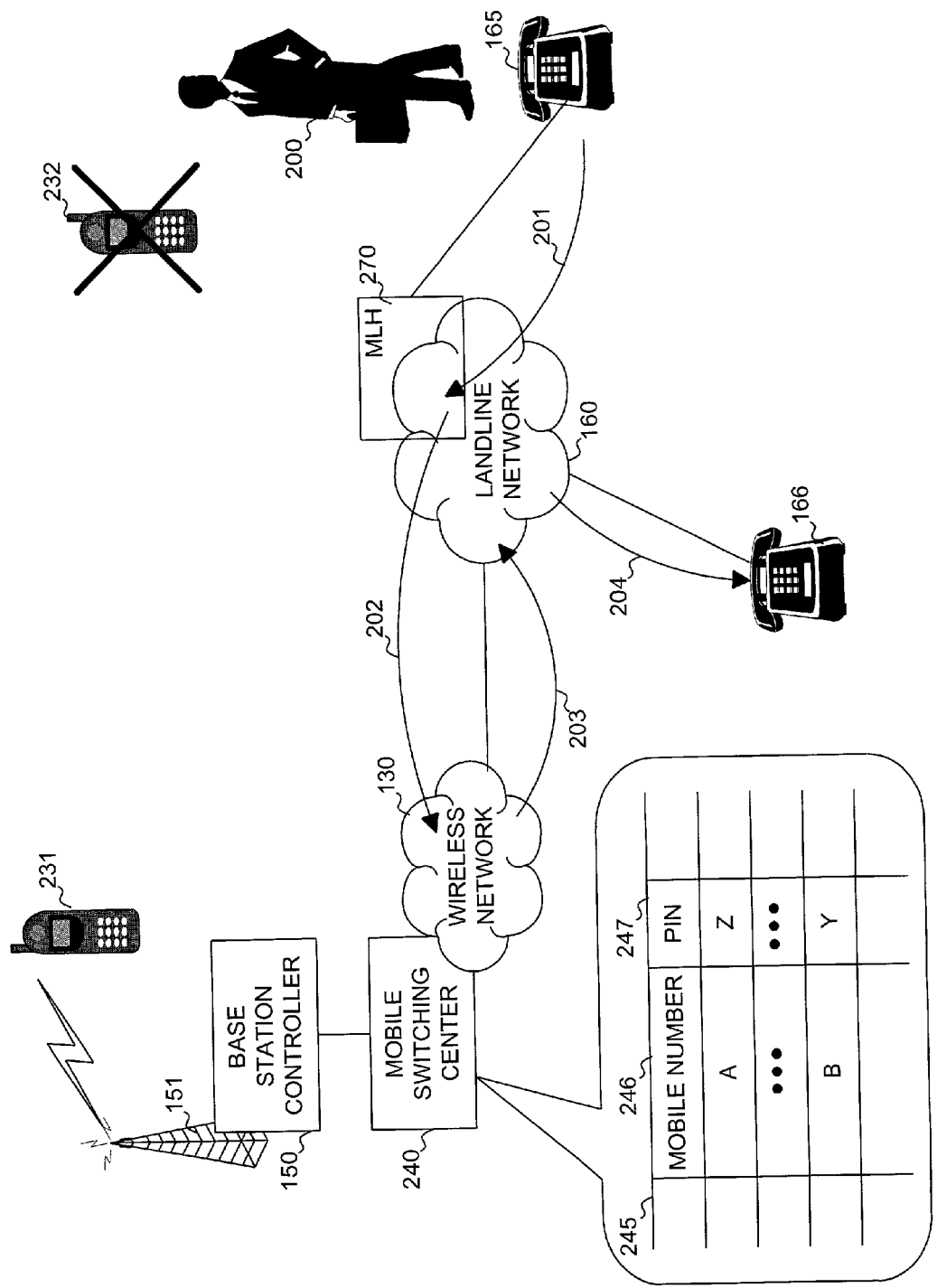
FIG. 2 is a schematic diagram illustrating another embodiment of the present invention.

FIG. 2 is a schematic diagram illustrating another embodiment of the present invention. A subscriber 200 having a contract with an operator of wireless network 130 is unwilling or unable to use wireless communications device 232. Subscriber 200 desires to engage in communications based at least in part on the contract he has concerning use of wireless network 130. Subscriber 200 can access telephone 165 and dial an access number associated with MLH 270. The access number can be a local telephone number, a regional telephone number, a toll-free number, and so on. Telephone 165 is coupled to landline network 160, and after subscriber 200 dials the access number, telephone 165 is coupled to MLH 270 (step 201). In an embodiment, MLH 270 includes a plurality of dedicated ports coupled to wireless network 130 so that a plurality of subscribers can be coupled to wireless network 130 via MLH 270. MLH 270 is coupled to wireless network 130, so that after subscriber 200 has dialed the access number, telephone 165 is coupled to wireless network 130 (step 202).

Wireless network 130 can then prompt subscriber 200 to enter call completion information and authorization information. For example, in an embodiment, subscriber 200 is coupled to mobile switching center 240, which includes subscriber administration information. The subscriber administration information can include subscriber landline access data records 245. When subscriber 200 enters his authorization information, the mobile switching center 240 can determine whether subscriber 200 entered the correct authorization information by accessing the subscriber landline access data records 245. A subscriber landline access data record 245 can include a mobile number field 246 to store a mobile number and a PIN field 247 to store a PIN. In other embodiments of the present invention, different types of authorization information can be stored in the subscriber landline access data records 245.

After wireless network 130 has authorized the user, wireless network 130 can complete the subscriber's call based on the call completion information received from the subscriber. For example, subscriber 200 can instruct wireless network 130 to place a call to telephone 166 coupled to landline network 160. Accordingly, after wireless network 130 has authorized the user and received the call completion information, wireless network 130 can communicate with landline network 160 to complete the call through to telephone 166 (steps 203 and 204). Wireless network 130 can administer the call (e.g., track call length, include any long-distance charges, track any fees due landline network 160 for completing the call through to telephone 166) and update subscriber usage data much as a typical wireless call is handled by wireless network 130.

Figure 3:
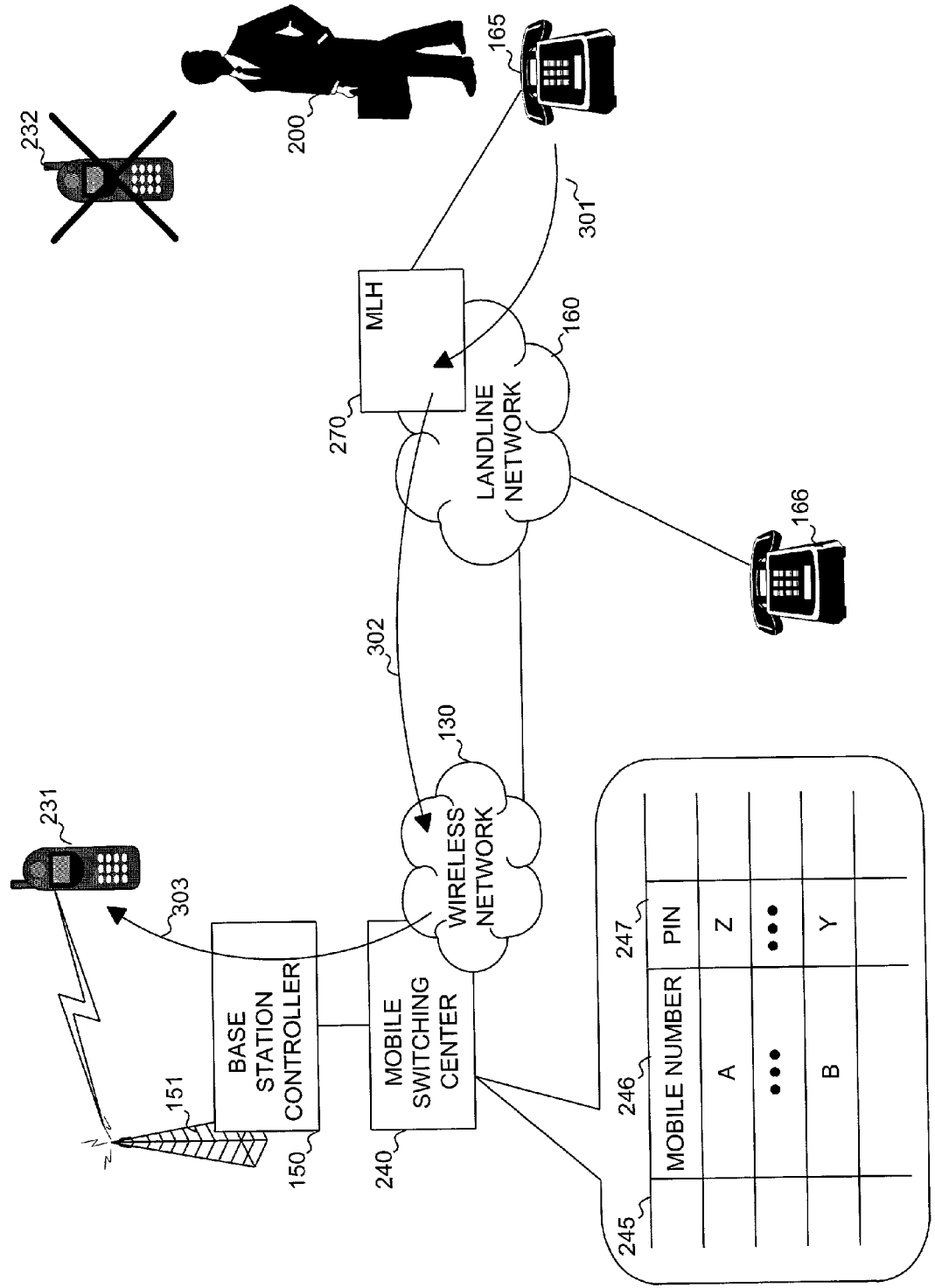
FIG. 3 is a schematic diagram of another embodiment of the present invention.

FIG. 3 is a schematic diagram of another embodiment of the present invention. Subscriber 200 can place a call to wireless communications device 231 that is within the operational area of wireless network 130. Subscriber 200 can dial an access number and be connected to wireless network 130 via landline network 160 and MLH 270 (steps 301 and 302). Wireless network 130 can authorize subscriber 200 based at least in part on authorization information received from subscriber 200. After subscriber 200 is authorized, the wireless network 130 can complete the call from subscriber 200 to wireless communications device 231 (step 303).

Figure 4:
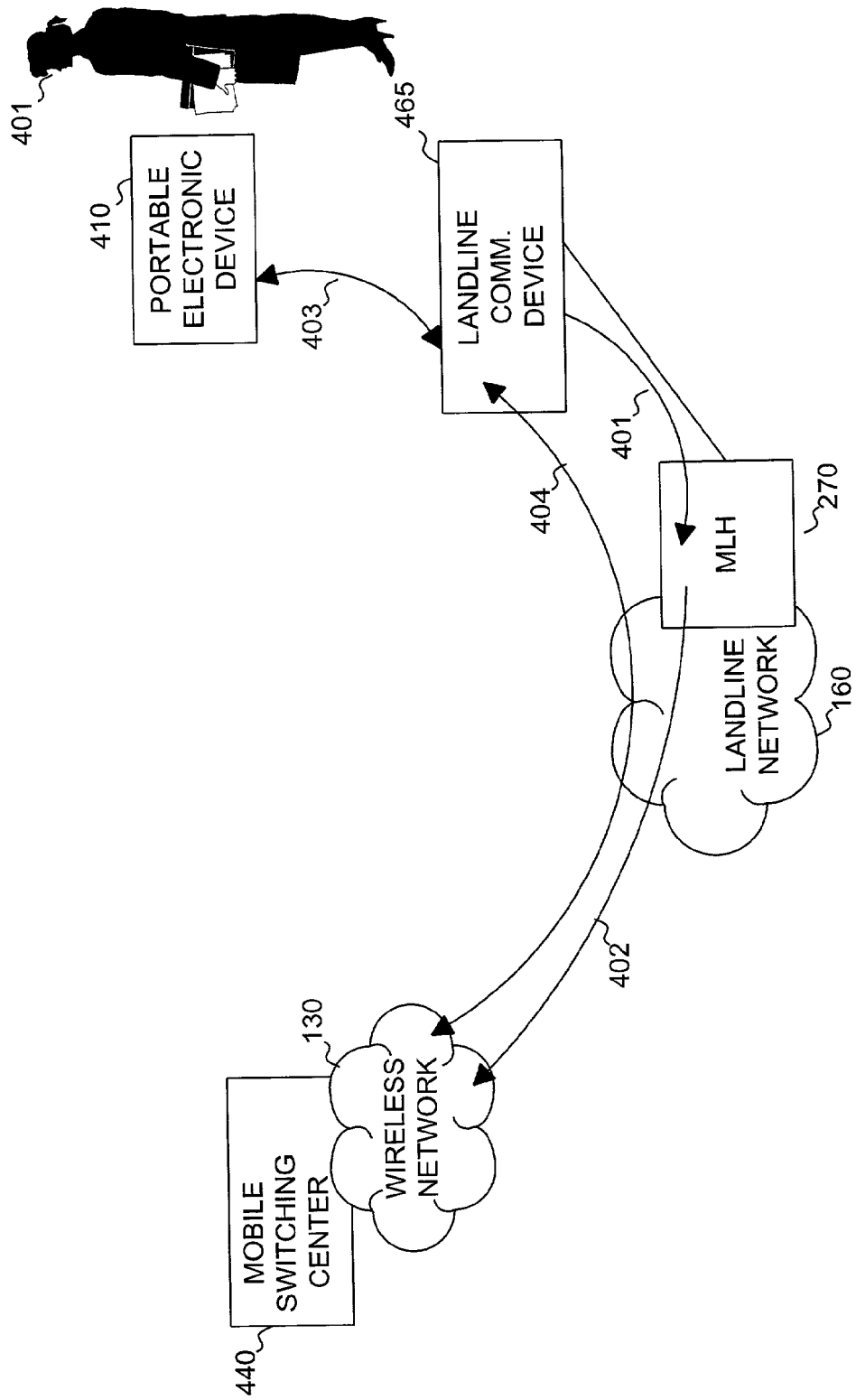
FIG. 4 is a schematic diagram illustrating another embodiment of the present invention.

FIG. 4 is a schematic diagram illustrating another embodiment of the present invention. A mobile switching center 440 of wireless network 130 can store user authentication information to authenticate users accessing wireless network 130 via landline network 160. The mobile switching center 440 can also respond to user call completion information. For example, a user 401 can access a landline communications device 465 that can be coupled to MLH 270 and to landline network 160. User 401 is a subscriber of communications services provided at least in part by wireless network 130. User 401 may be unable or unwilling to use a wireless communications device that she typically uses in communicating with wireless network 130.

In an embodiment of the present invention, landline communications device 465 includes an acoustic coupler that can communicate with the portable electronic device 410. Portable electronic device 410 stores authentication data of user 401 and includes a speaker to generate acoustic data signals. The user 401 can dial an access number and be connected to wireless network 130 and mobile switching center 440 via MLH 270 (steps 401 and 402). Mobile switching center 440 can include a modem system that can receive data from the acoustic coupler of landline communications device 465. To transmit the authentication data of user 401 to the wireless network 130, user 401 can trigger (e.g., press a button on) portable electronic device 410 to generate acoustic data signals that can be received by the acoustic coupler of the landline communications device 465 (step 403). The landline communications device can then send the authentication data of user 401 to the mobile switching center 440 (step 404).

In another embodiment of the present invention, each of portable electronic device 410 and landline communications device 465 can include a wireless communications port (e.g., a radio-frequency port, an infra-red port, a Bluetooth port, a wireless local area network port, etc.). Portable electronic device 410 can be a personal digital assistant ("PDA"), a wireless communications device, a cellular telephone, an interactive pager, a combination thereof, and so on. Portable electronic device 410 and landline communications device 465 can engage in wireless communications to send and receive calling information. For example, portable electronic device 410 can transmit to landline communications device 465 an access number corresponding to MLH 270 so that landline communications device 465 can be coupled to wireless network 130. Wireless network 130 can then send a signal to portable electronic device 410 indicating that it is ready to receive authentication information and call completion information. The portable electronic device 410 can then send the authentication information and call completion information of user 401 to the wireless network 130. Wireless network 130 can then setup a communication (e.g., a call, etc.) based at least in part on the call completion information.

In a further embodiment of the invention, portable electronic device 410 is an interactive pager, PDA, or portable computer that typically sends and receives e-mail via wireless network 130 when it is within the operational area of wireless network 130. User 401 may be in a non-operational area of wireless network 130 (e.g., outside the coverage area, in a weak signal area, etc.) and thereby be unable to send and receive e-mail. In accordance with an embodiment of the present invention, the portable electronic device 410 can transmit to landline communications device 465 an access number corresponding to MLH 270 so that landline communications device 465 can be coupled to wireless network 130. Wireless network 130 can then send a signal to portable electronic device 410 indicating that it is ready to receive authentication information and engage in data transmissions. The portable electronic device 410 can then send its authentication information (e.g., electronic serial number, mobile identifier, etc.) to the wireless network 130. After authenticating the portable electronic device 410, the wireless network 130 and portable electronic device 410 can then engage in data transmissions via the landline communication device 465 and landline network 160. Thus, for example, user 401 can receive and send e-mail via portable electronic device 410 even when the portable electronic device is outside the operational area of wireless network 130.

Figure 5:
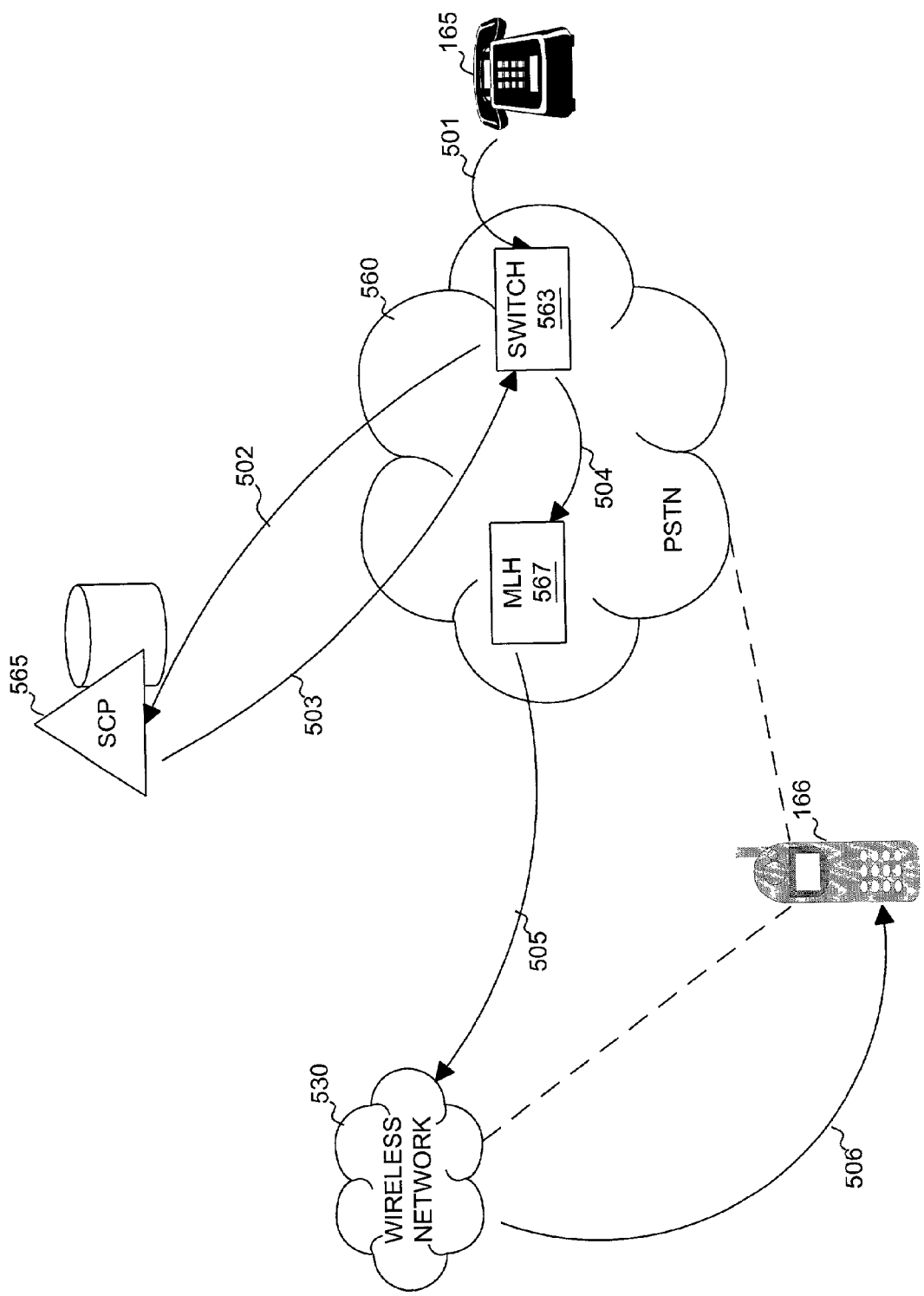
FIG. 5 is a schematic diagram of an embodiment of the present invention.
Figure 6:
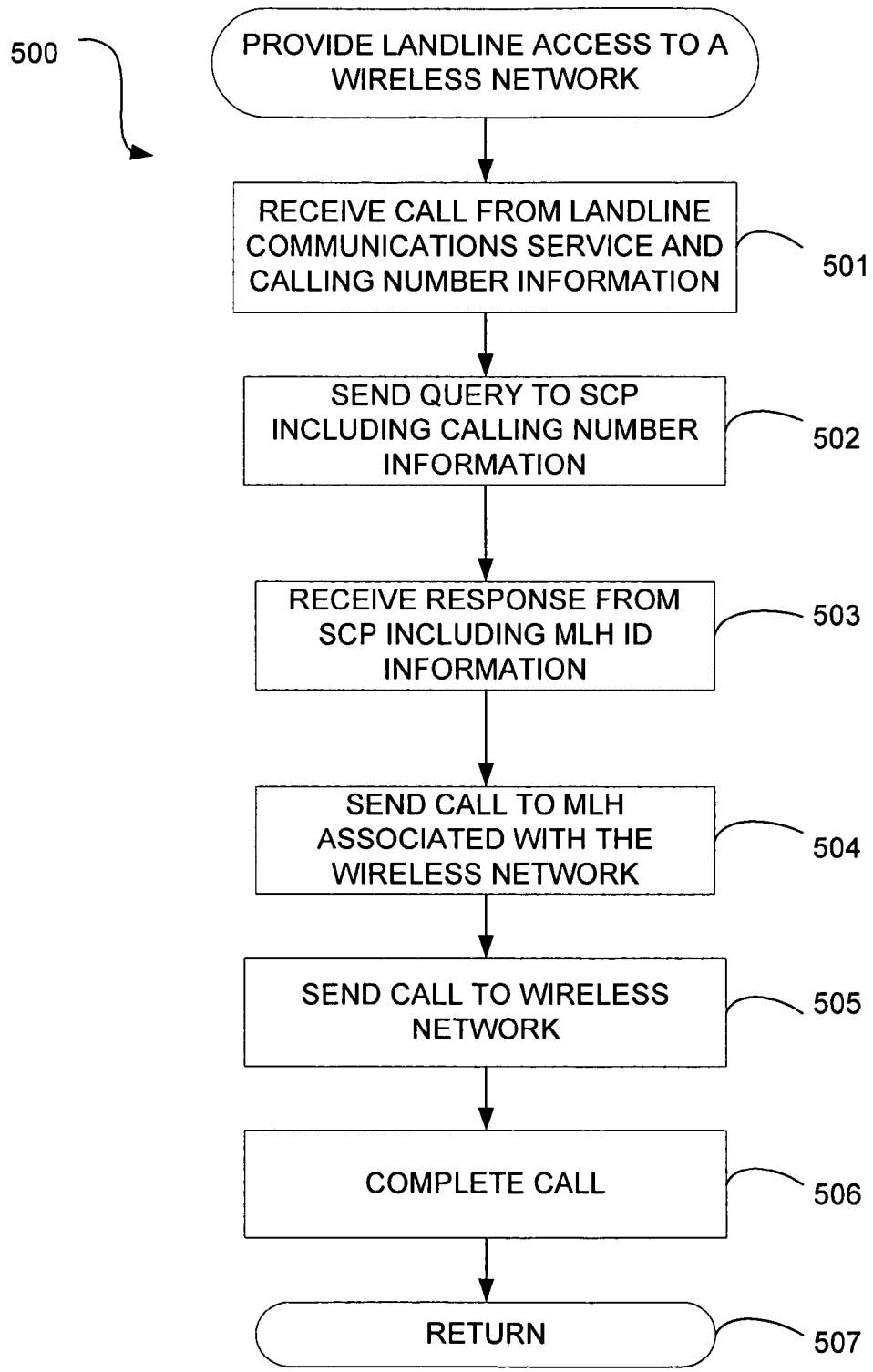
FIG. 6 is a flowchart diagram outlining computer program steps associated with FIG. 5 illustrating embodiments of the present invention.

FIG. 5 is a schematic diagram of an embodiment of the present invention. A user can access telephone 165 and dial a toll-free nationwide or regional number for providing landline access to a wireless network. Telephone 165 can be coupled to switch 563 of PSTN 560 after the user dials the toll-free number (step 501) to initiate the call. A query can be sent to SCP 565 to determine a local MLH to which the call can be connected based on the telephone number of telephone 165 (step 502). The SCP 565 can send a response to the switch 563 (step 503) indicating the identity of the local MLH, and the switch 563 can connect the call to the local MLH 567 (step 504). The local MLH 567 includes a port to the wireless network 530, and the call is connected to the wireless network 530 (step 505). After the wireless network 530 receives valid authorization information and call completion instructions from telephone 165, the call can be completed to telephone 166 (step 506). Telephone 166 can be typically coupled to wireless network 530 (i.e., a mobile telephone), to PSTN 560 (i.e., a landline telephone), a combination thereof (i.e., a fixed-location wireless telephone), and so on.

In another embodiment of the present invention, telephone 165 is associated with at least one telephone number. For example, when telephone 165 is a residential telephone, telephone 165 is associated with a residential telephone number that identifies telephone 165 to the PSTN 560. As a further example, when telephone 165 is a public pay phone, telephone 165 is associated with a public pay phone telephone number that identifies telephone 165 to the PSTN 560. In another example, when telephone 165 is a private branch exchange ("PBX") terminal telephone, telephone 165 can be associated with a terminal telephone number that identifies telephone 165 to the PSTN 560 or telephone 165 can be associated with a PBX telephone number that identifies the PBX to the PSTN 560.

When PSTN 560 receives the call from telephone 165 initiated by the user, the PSTN 560 receives calling number information (e.g., Caller ID information) corresponding to the telephone number associated with telephone 165 (step 501) and the calling number information can be sent to SCP 565 in the query sent to SCP 565 (step 502). The calling number information can also be sent to wireless network 530 when the call is connected to the wireless network 530 (step 505). When the wireless network 530 connects the call to telephone 166, the wireless network 530 can send the calling number information of telephone 165 to telephone 166. The calling number information of telephone 165, however, typically will not identify the user that initiated the call. Accordingly, instead of sending the calling number information of telephone 165 to telephone 166, the wireless network can send Caller ID information associated with the user to telephone 166 so that telephone 166 can display information that identifies the user. For example, the wireless network 530 can send a telephone number associated with the user (e.g., a wireless telephone number of the user), a name of the user, the home area location of the user's wireless network account (e.g., Atlanta, Ga.), a combination thereof, and so on.

Embodiments of the present invention relate to data communications via one or more networks. The data communications can be carried by one or more communications channels of the one or more networks. A network can include wired communication links (e.g., coaxial cable, copper wires, optical fibers, a combination thereof, and so on), wireless communication links (e.g., satellite communication links, terrestrial wireless communication links, satellite-to-terrestrial communication links, a combination thereof, and so on), or a combination thereof. A communications link can include one or more communications channels, where a communications channel carries communications. For example, a communications link can include multiplexed communications channels, such as time division multiplexing ("TDM") channels, frequency division multiplexing ("FDM") channels, code division multiplexing ("CDM") channels, wave division multiplexing ("WDM") channels, a combination thereof, and so on.

In accordance with an embodiment of the present invention, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed. The terms "instructions configured to be executed" and "instructions to be executed" are meant to encompass any instructions that are ready to be executed in their present form (e.g., machine code) by a processor, or require further manipulation (e.g., compilation, decryption, or provided with an access code, etc.) to be ready to be executed by a processor.

Systems and methods in accordance with an embodiment of the present invention disclosed herein can advantageously provide landline access to wireless networks. A subscriber of wireless network services can access communications services provided by a wireless network even though the subscriber is outside the operational area of the wireless network. The subscriber of the wireless network services can also access communications services provided by the wireless network even though the wireless communications device typically used by the subscriber to access the wireless network is not at hand, is inoperable, is unreliable, and so on.

Embodiments of systems and methods for landline access to wireless networks have been described. In the foregoing description, for purposes of explanation, numerous specific details are set forth to provide a thorough understanding of the present invention. It will be appreciated, however, by one skilled in the art that the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the present invention.

In the foregoing detailed description, systems and methods in accordance with embodiments of the present invention have been described with reference to specific exemplary embodiments. Accordingly, the present specification and figures are to be regarded as illustrative rather than restrictive. The scope of the invention is to be defined by the claims appended hereto, and by their equivalents.

What is claimed is:

1. A system for providing landline access to a wireless network, the system comprising:
   a landline communications network wherein the landline communications network is coupled to a landline communications device, the landline communications network configured to receive a wireless network landline access number from the landline communications device; and
   a multiline hunt group coupled to the landline communications network, the multiline hunt group including one or more dedicated ports, the one or more dedicated ports coupled to the wireless network;
   wherein the landline communications network sends a calling number associated with the landline communications device to a service control point as part of a query and receives a multiline hunt group access number from the service control point based at least in part on the query.

2. The system of claim 1, the system further comprising:
   a service control point ("SCP") coupled to the landline communications network, the service control point coupled to a database, the database storing multiline hunt group location information.

3. The system of claim 1, wherein the wireless network landline access number is associated with the multiline hunt group.

4. The system of claim 1, wherein the wireless network landline access number is a toll-free number.

5. A system for providing landline access to a wireless network, the system comprising:
   a landline communications network wherein the landline communications network is coupled to a landline communications device, the landline communications network configured to receive a wireless network landline access number from the landline communications device; and
   a multiline hunt group coupled to the landline communications network, the multiline hunt group including one or more dedicated ports, the one or more dedicated ports coupled to the wireless network;
   wherein the multiline hunt group is coupled to the landline communications device based at least in part on the landline communications network receiving the wireless network landline access number.

6. The system of claim 5, wherein the multiline hunt group is coupled to the wireless network.

7. The system of claim 6, wherein:
the multiline hunt group receives user authentication information from the landline communications device; and
the multiline hunt group sends the user authentication information to the wireless network.

8. The system of claim 7, wherein:
the multiline hunt group receives user call completion information from the landline communications device; and
the multiline hunt group sends the user call completion information to the wireless network.

9. A system for providing landline access to a wireless network, the system comprising:
a multiline hunt group including a plurality of incoming call ports and a plurality of wireless network ports, an incoming call port of the plurality of incoming call ports to receive a call, a wireless network port of the plurality of wireless network ports to send the call to the wireless network;
a landline communications network coupled to the multiline hunt group, the landline communications network including a central office switch; and
a service control point coupled to the landline communications network, the service control point including a database, the database including wireless network landline access information;
wherein:
the central office switch receives the call from a landline communications device, the landline communications device associated with at least one landline telephone number;
the central office switch sends a query to the service control point, the query including at least the landline telephone number;
the central office switch receives a response from the service control point, the response based at least in part on the query, the response including at least a multiline hunt group access number associated with the multiline hunt groups; and
the central office switch sends the call to the multiline hunt group based at least in part on the multiline hunt group access number.

10. The system of claim 9, wherein the service control point determines the multiline hunt group access number based at least in part on the wireless network landline access information and the landline telephone number.

11. The system of claim 9, the system further comprising:
a landline communications device coupled to the landline communications network, the landline communications device associated with at least one landline telephone number.

12. The system of claim 11, wherein the landline communications device is a landline telephone.

13. The system of claim 11, wherein the landline communications device includes a modem.

14. The system of claim 13, wherein the modem is an acoustical modem.

15. The system of claim 11, wherein the landline communications device includes a wireless data port.

16. The system of claim 15, wherein the wireless data port is configured to wirelessly communicate with a portable electronic device.

17. The system of claim 16, wherein the wireless data port is configured to wirelessly communicate using radio-frequency signals.

18. The system of claim 16, wherein the wireless data port is configured to wirelessly communicate using infra-red signals.

19. A method for providing landline access to a wireless network, the method comprising:
operating a central office switch, the central office switch to receive the call from the landline communications device;
receiving a call from a landline communications device;
receiving calling number information associated with the landline communications device;
sending a query to a service control point, the query including at least in part the calling number information;
receiving a response from the service control point, the response based at least in part on the query, the response including multiline hunt group identification information;
sending the call from the central office switch to a multiline hunt group of a landline communications network, the multiline hunt group associated with the wireless network; and
sending the call to the wireless network.

20. The method of claim 19, the method further comprising:
operating the landline communications network.

21. The method of claim 20, the method further comprising:
operating the landline communications device, the landline communications device coupled to the landline communications network.

22. The method of claim 19, wherein the multiline hunt group identification information includes a telephone number of the multiline hunt group.

23. The method of claim 19, wherein sending the call to a multiline hunt group of a landline communications network is based at least in part on the multiline hunt group identification information.

24. The method of claim 19, wherein the call is a call to a toll-free telephone number.

25. The method of claim 19, the method further comprising:
operating the landline communications network;
operating the landline communications device, the landline communications device coupled to the landline communications network;
receiving user authentication information from the landline communications device; and
sending the user authentication information to the wireless network.

26. The method of claim 25, the method further comprising:
receiving call completion information from the landline communications device; and sending the call completion information to the wireless network.

27. The method of claim 26, the method further comprising:
receiving a call completion request from the wireless network; and
completing the call to a called landline communications device based at least in part on the call completion request.

28. A method for providing landline access to a wireless telecommunications network, the method comprising:

operating a landline telecommunications device;
receiving at a central office switch a call to a wireless telecommunications network access telephone number from the landline telecommunications device;
switching the call to a multiline hunt group of the landline telecommunications network, the multiline hunt group associated with the wireless telecommunications network;
sending the call to the wireless telecommunications network via a dedicated port of the multiline hunt group, the dedicated port being coupled to the wireless telecommunications network.

29. A method for providing landline access to a wireless telecommunications network, the method comprising:
operating a landline telecommunications device;
receiving a call to a wireless telecommunications network access telephone number from the landline telecommunications device wherein receiving the call to the wireless telecommunications network access telephone number includes receiving calling number information associated with the landline telecommunications device;
sending a query to a service control point, the service control point including a database storing multiline hunt group connection information, the query including the calling number information;
receiving a response from the service control point, the response including at least a portion of the multiline hunt group connection information;
sending the call to a multiline hunt group of the landline telecommunications network, the multiline hunt group associated with the wireless telecommunications network; and
sending the call to the wireless telecommunications network.

30. The method of claim 29, wherein:
the multiline hunt group connection information includes a plurality of multiline hunt group telephone numbers; and
the at least a portion of the multiline hunt group connection information includes one or more of the plurality of multiline hunt group telephone numbers.

31. The method of claim 29, wherein sending the call to the multiline hunt group of the landline telecommunications network is based at least in part on the at least a portion of the multiline hunt group connection information.

32. A system for providing landline access to a wireless network, the system comprising:
means for receiving a call from a landline communications device;
means for receiving calling number information associated with the landline communications device;
means for sending a query to a service control point, the query including at least in part the calling number information;
means for receiving a response from the service control point, the response based at least in part on the query, the response including multiline hunt group identification information;
means for sending the call to a multiline hunt group of a landline communications network, the multiline hunt group associated with the wireless network; and
means for sending the call to the wireless network.

33. The system of claim 32, wherein the multiline hunt group identification information includes a telephone number of the multiline hunt group.

34. The system of claim 32, wherein the means for sending the call to a multiline hunt group of a landline communications network is responsive at least in part to the multiline hunt group identification information.

35. A method for providing landline access to a wireless network, the method comprising:
a step for receiving a call from a landline communications device;
a step for receiving calling number information associated with the landline communications device;
a step for sending a query to a service control point, the query including at least in part the calling number information; and
a step for receiving a response from the service control point, the response based at least in part on the query, the response including multiline hunt group identification information;
a step for sending the call to a multiline hunt group of a landline communications network, the multiline hunt group associated with the wireless network; and
a step for sending the call to the wireless network.

36. The method of claim 35, wherein the multiline hunt group identification information includes a telephone number of the multiline hunt group.

37. The method of claim 35, wherein the step for sending the call to a multiline hunt group of a landline communications network is based at least in part on the multiline hunt group identification information.

38. A computer-readable medium storing a plurality of instructions to be executed by a processor for providing landline access to a wireless network, the plurality of instructions comprising instructions to:
receive a call from a landline communications device;
receive calling number information associated with the landline communications device;
send a query to a service control point, the query including at least in part the calling number information; and
receive a response from the service control point, the response based at least in part on the query, the response including multiline hunt group identification information;
send the call to a multiline hunt group of a landline communications network, the multiline hunt group associated with the wireless network; and
send the call to the wireless network.

39. The computer-readable medium of claim 38, wherein the multiline hunt group identification information includes a telephone number of the multiline hunt group.

40. The computer-readable medium of claim 38, wherein the instructions to send the call to a multiline hunt group of a landline communications network are responsive at least in part to the multiline hunt group identification information.

41. A system for providing landline access to a wireless network, the system comprising:
a landline communications network;
a multiline hunt group coupled to the landline communications network, the multiline hunt group including one or more dedicated ports, the one or more dedicated ports coupled to the wireless network; and
a landline communications network administration system coupled to the landline communications network, the landline communications network administration system to track usage of the multiline hunt group wherein the landline communications network administration system sends usage records to the wireless network, the usage records based at least in part on the tracked usage of the multiline hunt group.

* * * * *